Dec. 1, 1959 R. F. PEDRICK 2,915,591

TELEPHONE SYSTEM TRUNK CIRCUIT

Filed Aug. 19, 1957 4 Sheets-Sheet 1

INVENTOR.
ROBERT F. PEDRICK

BY F. H. Henson

AGENT

Dec. 1, 1959 R. F. PEDRICK 2,915,591

TELEPHONE SYSTEM TRUNK CIRCUIT

Filed Aug. 19, 1957 4 Sheets-Sheet 2

INVENTOR.
ROBERT F. PEDRICK

BY F. H. Henson

AGENT

Dec. 1, 1959 R. F. PEDRICK 2,915,591

TELEPHONE SYSTEM TRUNK CIRCUIT

Filed Aug. 19, 1957 4 Sheets-Sheet 3

INVENTOR.
ROBERT F. PEDRICK

BY F. W. Henson

AGENT

Dec. 1, 1959 R. F. PEDRICK 2,915,591

TELEPHONE SYSTEM TRUNK CIRCUIT

Filed Aug. 19, 1957 4 Sheets-Sheet 4

INVENTOR.
ROBERT F. PEDRICK
BY F. W. Hanson
AGENT

United States Patent Office 2,915,591

Patented Dec. 1, 1959

2,915,591

TELEPHONE SYSTEM TRUNK CIRCUIT

Robert F. Pedrick, Rochester, N.Y., assignor to General Dynamics Corporation, Rochester, N.Y., a corporation of Delaware Application August 19, 1957, Serial No. 678,977

5 Claims. (Cl. 179—27)

Figure 1:
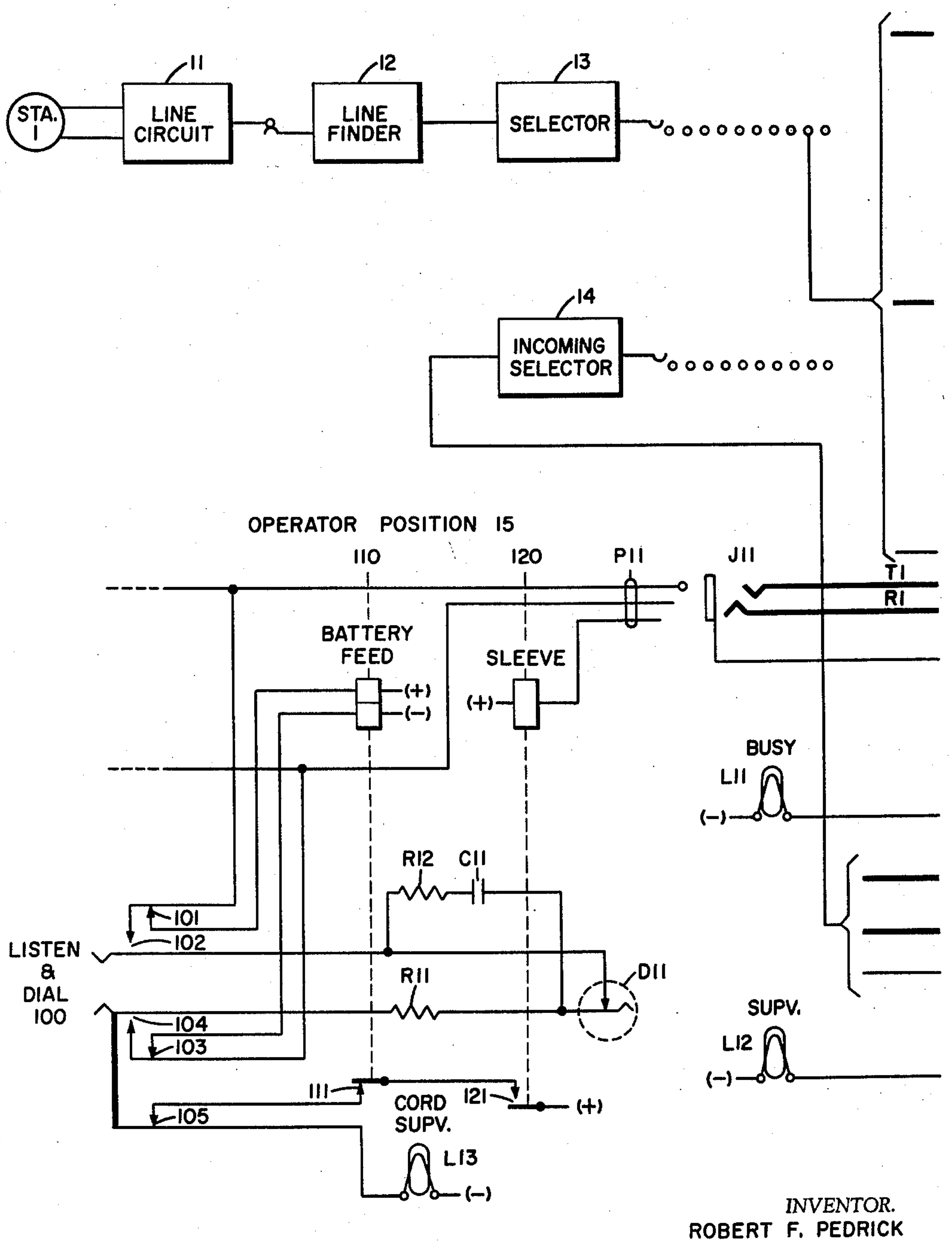

This invention relates in general to telephone systems and, more particularly, to telephone system trunk circuits for use in extending calls between remotely located private branch exchanges.

In large business concerns with several branch offices, it is desirable to directly dial subscriber stations in any office from any subscriber station or from an attendant's cabinet in any other office. Conventionally, an attendant's cabinet or operator position is provided in each office for handling calls incoming to that office from the local community telephone system. The attendant's cabinet or operator position is usually given connector banks access to the subscriber stations within the office to obviate the need for dialing on the part of the attendant in handling incoming calls. That is, the cord circuits at the operator position are plugged into jacks directly associated with the line circuits. The standard line circuit is seized by applying ground potential to the sleeve conductor to operate the cutoff relay which, in turn, disconnects the line relay from the tip and ring conductors. Thus, it is necessary to provide a battery feed relay in the cord circuit to provide talking battery for the subscriber station. It is, of course, necessary to use the same cord circuits for the purpose of extending calls from the operator's position over a trunk line to a remote office.

Conventionally, the tip and ring conductors of the cord circuit are connected to the ring and tip conductors, respectively, of the outgoing trunk circuit so that the battery feed relay in the cord circuit and the calling bridge relay in the trunk circuit operate in series. Prior to this invention, disconnect supervision has not been given to the operator on a call through a trunk circuit to a distant office since it is impossible to reverse battery over the tip and ring conductors from the outgoing trunk circuit to the cord circuit without shunting down the trunk circuit calling bridge relay and thus releasing the extended connection.

Accordingly, it is the general object of this invention to provide a new and improved telephone system.

It is a more particular object of this invention to provide a trunk circuit for use in extending calls between remotely located private branch exchanges, which trunk circuit will return disconnect supervision to an attendant's cabinet of the type described above.

Briefly, the invention accomplishes the above cited objects by providing a two-way trunk circuit, accessible to both local dial equipment and an operator's position on outgoing calls, which functions to open the line conductors between the cord circuit and the trunk circuit and to hold the calling bridge relay of the trunk circuit operated when the transmittal of an answer supervisory signal over the trunk line is discontinued in the remote office. The trunk circuit is arranged to reverse battery to the cord circuit on seizure, as controlled by ground potential applied to the cord circuit sleeve conductor, for the purpose of operating the cord circuit battery feed relay and the trunk circuit calling bridge relay in series. By virtue of the fact that battery is already reversed over the line conductors and since the relay which accomplishes same is locked operated, answer supervision received over the trunk line during the progress of the call is not repeated to the cord circuit. However, when the transmittal of the answer supervisory signal is discontinued in the distant office, a supervisory relay in the trunk circuit releases and a slow-operate disconnect relay operates through break contacts of said supervisory relay and through operated contacts of a second supervisory relay, which relay is operated under control of the supervisory relay and locked operated to ground potential on the cord circuit sleeve conductor. The operated disconnect relay serves to open the line conductors and to complete a holding circuit for the trunk circuit calling bridge relay. Thus, the cord circuit battery feed relay releases to give the operator disconnect supervision and the calling bridge relay remains operated to maintain the established connection.

When the trunk circuit is seized by local dial equipment on an outgoing call, the battery reversing relay does not operate on seizure of the trunk circuit. Rather, the battery reversing relay operates under control of the trunk circuit supervisory relay to reverse battery over the line conductors when answer supervision is received over the trunk line. When the transmittal of the answer supervisory signal is discontinued in the remote office, the slow-operate disconnect relay does not operate since the second supervisory relay releases immediately after the release of the supervisory relay.

Further objects and advantages of the invention will become apparent as the following description proceeds, and features of novelty which characterize the invention will be pointed out in particularity in the claims annexed to and forming a part of this specification.

For a better understanding of the invention, reference may be had to the accompanying drawings which comprise four figures on four sheets.

Fig. 1 shows the cord circuit portion of a P.B.X operator's position in detail and the P.B.X local dial equipment in block diagram form.

Figure 2:
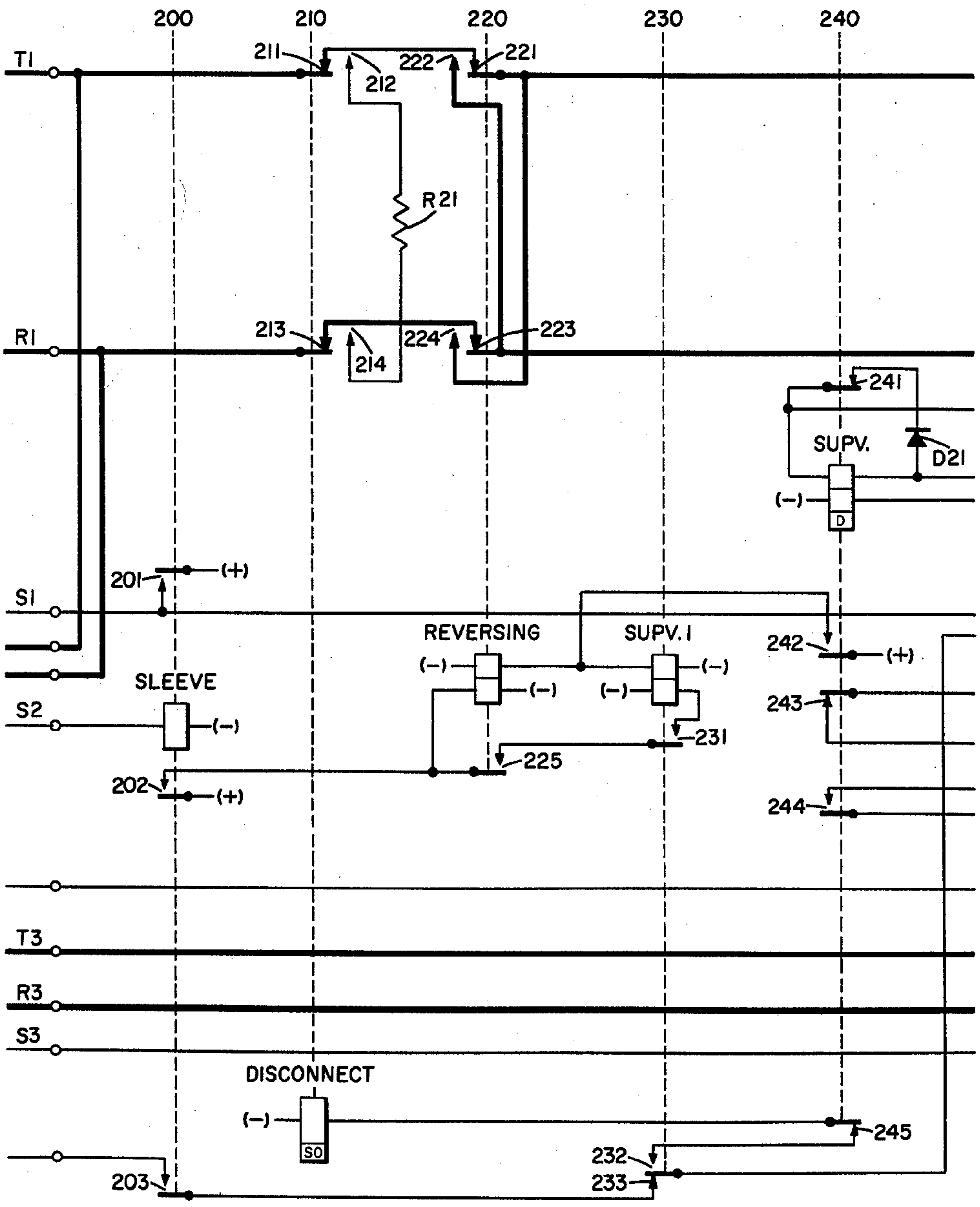
Figure 3:
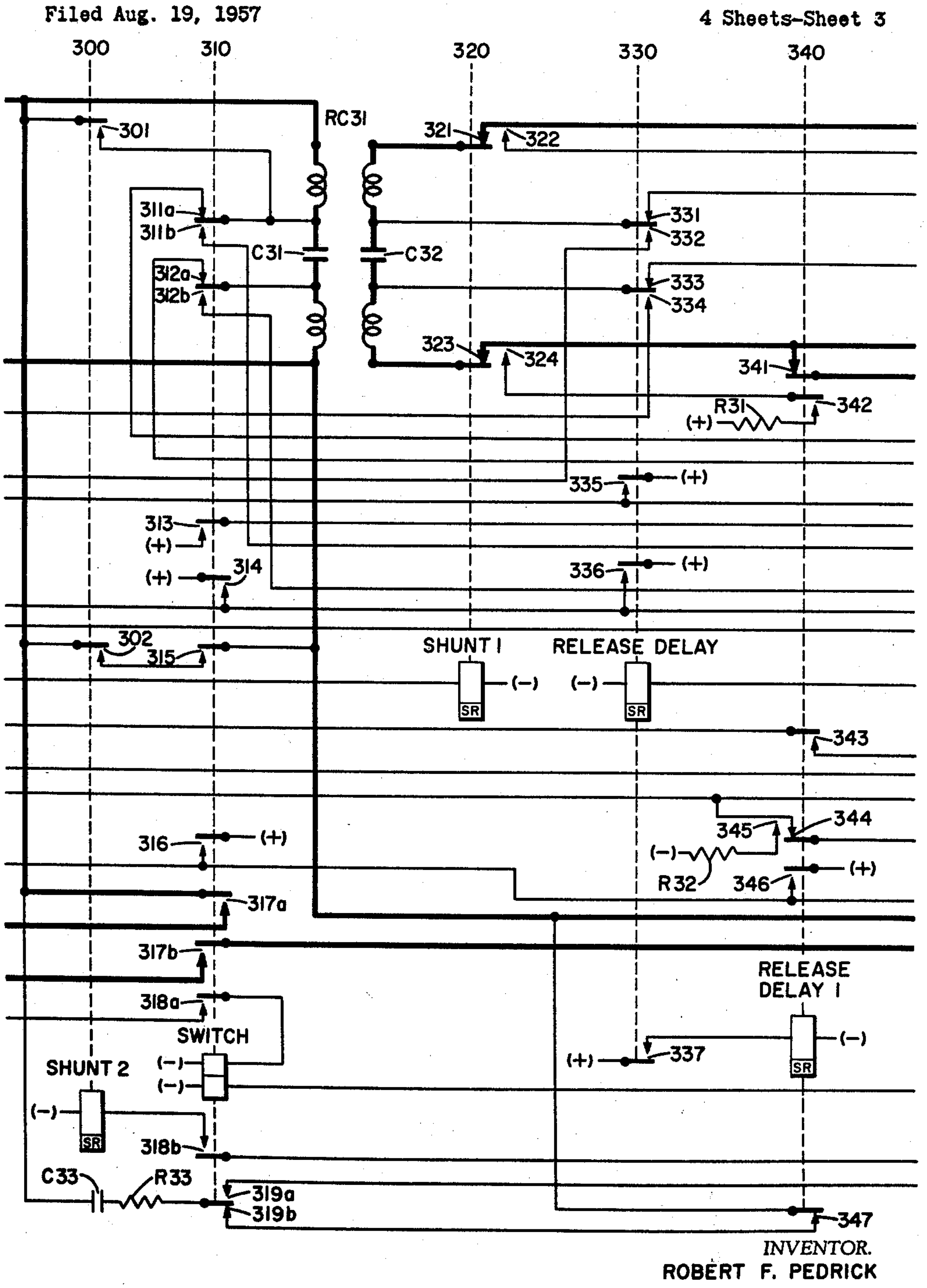
Figure 4:
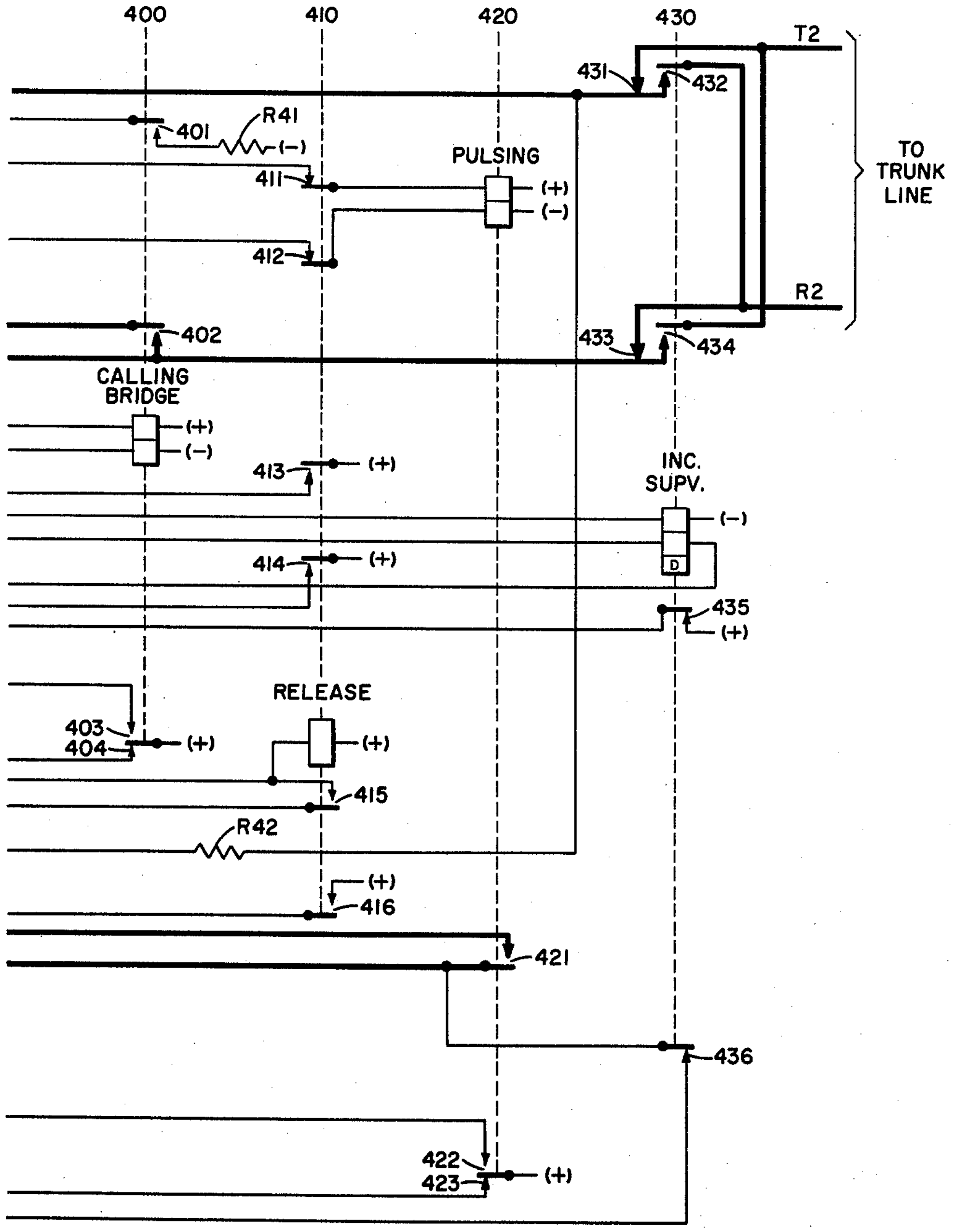

Figs. 2, 3, and 4 show circuit details of a two-way trunk circuit suitable for extending outgoing calls from either the operator's position, or dial equipment of Fig. 1, to a remote P.B.X, and for extending calls from a remote P.B.X to the dial equipment of Fig. 1.

*Outgoing call from operator position 15*

A call to a subscriber station located in a remote P.B.X is initiated at the operator position 15 by plugging the plug P11 of the cord circuit into jack J11, which is individually associated with the trunk circuit of Figs. 2, 3, and 4. Sleeve relay 120 in the cord circuit operates in series with sleeve relay 200 of the trunk circuit when plug P11 is inserted in jack J11. At its operated contacts 201, relay 200 applies ground to conductor S1 for the purpose of marking the trunk circuit busy in the outgoing selector banks. At contacts 203, relay 200 completes a circuit for supervisory lamp L12 for the purpose of indicating that the trunk circuit has been taken into use. The circuit for supervisory lamp L12 extends from ground on break contacts 435 and through contacts 233 and 203. At contacts 202, relay 200 closes an obvious operating circuit for reversing relay 220.

Calling bridge relay 400 of the trunk circuit and battery feed relay 110 of the cord circuit now operate in series over a circuit extending from ground through the upper winding of relay 400, through contacts 311*a*, the upper left winding of repeat coil RC31, operated contacts 224 on relay 220, contacts 213, over the ring conductor R1, through break contacts 103 on the unoperated listen and dial key 100, and through the lower winding of relay 110 to battery. A series circuit is also completed from battery through the lower winding of relay 400, through contacts 312*a*, the lower left winding of repeat coil RC31, operated contacts 222, contacts 211, tip conductor T1, through break contacts 101 on listen and dial key 100, and through the upper winding of relay 110 to ground. It can be seen that the cord supervisory lamp L13 is not illuminated at this time since break contacts 111 on relay 110 are open.

In the trunk circuit, the operation of relay 400 and the resulting operation of contacts 403 serve to operate release delay relay 330. A loop circuit is now closed to the trunk line conductors T2 and R2 for the purpose of seizing a trunk circuit, similar to the illustrated trunk circuit, in the remote office. The loop circuit extends from the trunk line tip conductor T2, through contacts 431, contacts 321, the upper right winding of repeat coil RC31, operated contacts 332, through the upper winding of supervisory relay 240, which is shunted by diode D21 and contacts 241 in series, through operated contacts 334, the lower right winding of repeat coil RC31, contacts 323, contacts 402, and through contacts 433 to the trunk line ring conductor R2. Since ground potential is normally applied to tip conductor T2 and battery potential is applied to ring conductor R2 in the remote office, diode D21 shortcircuits the upper winding of relay 240 at this time and said relay remains unoperated. Relay 240 is further biased for non-conduction at this time by ground potential connected through contacts 335 and through its lower winding to battery. At contacts 336, relay 330 closes an alternate busying ground to the sleeve conductor S1 and at its operated contacts 337, closes an obvious operating circuit for release delay 1 relay 340.

At contacts 346, relay 340 connects ground to busy lamp L11 for the purpose of illuminating said lamp to indicate the busy condition of the circuit. At contacts 347, relay 340 removes the idle line termination, comprising capacitor C33 and resistor R33, from across the left-hand windings of repeat coil RC31. Idle line termination is removed at this time since the repeat coil is now terminated at the operator position 15.

For the purpose of selecting the desired called line in the remote office, the operator now operates the listen and dial key 100. At contacts 101 and 103 of key 100, the battery feed relay 110 is disconnected from the cord circuit tip and ring conductors and the dial impulse springs D11 are connected through contacts 102 and 104 to said tip and ring conductors. Operation of the dial serves to open and reclose the operating circuit of calling bridge relay 400 and relay 400 repeats the dial impulses to the trunk line. Shunt 1 relay 320 operates on the first release of the calling bridge relay 400 over a circuit extending from ground, through contacts 404, 343, 243, and through its winding to battery. At contacts 321 and 323, relay 320 removes the upper winding of relay 240 from the trunk line conductors T2 and R2 and at contacts 322 and 324, replaces the winding of said relay with battery through resistor R41 and contacts 401, and ground through resistor R31 and contacts 342, respectively. Thus on each impulse, relay 400 opens the battery connection to tip conductor T2 at contacts 401 and opens the ground connection to ring conductor R2 at contacts 402. This so-called "battery and ground pulsing" is utilized for impulsing over trunk lines having a large ohmic resistance. The current through the calling bridge relay in the remote office is effectively doubled by the use of battery ground pulsing in place of the conventional opening and closing of a loop circuit in the outgoing trunk circuit. Shunt 1 relay 320 is, of course, slow-release and remains operated over the pulsing of contacts 404. At the end of each digit, shunt 1 relay releases to reconnect the upper winding of relay 240 in a loop circuit to the trunk line.

At the completion of dialing, the operator restores listen and dial key 100 to reconnect battery feed relay 110 to the tip and ring conductors of the cord circuit. Thus at the completion of dialing, relays 110 and 400 are once again operated in series.

When the call is answered at the station on the selected called line in the remote office, battery is reversed over trunk line conductors T2 and R2 in the conventional manner. Supervisory relay 240 in the illustrated trunk circuit operates since its two windings are now connected in series aiding relationship and diode D21 is poled for non-conduction. At contacts 242, relay 240 closes an obvious operating circuit for supervisory 1 relay 230, which relay, in turn, locks operated from ground on contacts 202 and through contacts 225 and 231 and through its lower winding to battery. At contacts 233, relay 230 opens the circuit to supervisory lamp L12 so that said lamp is dark after the call is answered. Release relay 410 now operates from a circuit extending from battery, through resistor R32, contacts 345, contacts 244, and through its winding to ground. At contacts 415, release relay 410 locks operated to the battery on contacts 345 independently of contacts 244. Relay 410 serves no function at this time.

When the called party in the remote office restores his handset to the cradle for the purpose of discontinuing the call or for recalling the operator, the transmittal of reverse battery is discontinued in the remote office and supervisory relay 240 in the illustrated trunk circuit releases. When relay 240 releases, disconnect relay 210 operates over a circuit extending from ground on contacts 435, through contacts 232 and 245, and through its winding to battery. At contacts 211 and 213, disconnect relay 210 opens conductors T1 and R1 to thereby release the battery feed relay 110 in the cord circuit. At contacts 212 and 214, relay 210 closes a holding circuit through resistor R21 to the calling bridge relay 400 for the purpose of holding relay 400 operated and thus maintaining the established connection. Cord supervisory lamp L13 is now illuminated from ground through contacts 121, 111, and 105 for the purpose of giving the operator disconnect supervision. If the called party should wish to recall the operator, he, of course, will flash his hookswitch and thus flash cord supervisory lamp L13.

In response to the steady illumination of cord supervisory lamp L13, the operator disconnects plug P11 from jack J11 to thereby release relays 120 and 200. The opening of contacts 202 serves to release relays 220 and 230, and the release of relay 230 releases relay 210 at contacts 232. When relay 210 releases to open contacts 212 and 214, relays 400, 330, 340, and 410 release in turn.

*Outgoing call from STA1*

A call from STA1 to a called party in the remote office is extended through line circuit 11, line finder 12, and level 9 of selector 13 to the illustrated trunk circuit. When selector 13 switches through and the loop closed at STA1 is connected to tip and ring conductors T1 and R1, calling bridge relay 400 operates over the previously described circuit. Relays 330 and 340 also operate as previously described. It is to be noted that on a local call of the type now being described, sleeve relay 200 and reversing relay 220 do not operate so that battery is not reversed to the calling line responsive to the seizure of the trunk circuit. Dial impulses originating at the calling station are repeated to the trunk line conductors by calling bridge relay 400 at contacts 401 and 402 in the exact same manner as described above. Shunt 1 relay 320 operates and remains operated for the duration of each digit of the called line number.

When the call is answered at the called station in the remote office and battery potential is reversed over the trunk line conductors, supervisory relay 240 in the trunk circuit operates over the previously described circuit. At contacts 242, relay 240 closes obvious operating circuits for reversing relay 220 and supervisory 1 relay 230. At contacts 221, 222 and 223, 224, relay 220 reverses battery to the calling line. Release relay 410 also operates in response to the operation of relay 240 over a circuit extending from battery, through resistor R32, contacts 345, contacts 244, and through its winding to ground. As previously described, relay 410 locks operated through its contacts 415.

If the called party should hang up first, relay 240 releases and, since no locking ground was supplied for relays 220 and 230, these relays also release. It can be seen that disconnect relay 210 is prevented from operating on a call from a local subscriber since supervisory relay 230 releases immediately after the release of relay 240 and at contacts 232, opens the operating circuit to relay 210.

If the calling party should hang up while the called station is still in an off-hook or answered condition, relays 400, 330, and 340 release but release relay 410 remains operated over a circuit extending from ground, through its winding, through contacts 415, now closed break contacts 344, resistor R42, contacts 431, to battery on tip conductor T2. At contacts 411 and 412, relay 410 maintains incoming pulsing relay 420 disconnected from the trunk line conductors and at contacts 414, maintains a busying ground potential on the sleeve conductor S1. When the trunk circuit at the distant end releases and the battery over the trunk line conductors T2 and R2 reverts to normal, release relay 410, of course, releases.

*Incoming call*

An incoming call to the illustrated trunk circuit is initiated by the closing of a loop circuit in the distant office across the trunk line conductors T2 and R2. Pulsing relay 420 operates over a circuit extending from ground, through its upper winding, contacts 411, 331, the upper right winding of repeat coil RC31, contacts 321, 431, over tip conductor T2, through the loop closed in the distant office trunk circuit, back over ring conductor R2, through contacts 433, 341, contacts 323, the lower right winding of repeat coil RC31, through contacts 333, contacts 412, and through its lower winding to battery. At contacts 422, relay 420 closes an obvious operating circuit to the lower winding of switch relay 310. A loop circuit is now closed to seize the incoming selector 14 in the local office. The circuit extends from tip conductor T3, through contacts 317*a*, the upper left winding of repeat coil RC31, contacts 311*b*, the lower winding of relay 430, contacts 312*b*, the lower left winding of repeat coil RC31, contacts 421, contacts 317*b* to ring conductor R3. When the incoming selector is seized, ground returned over sleeve conductor S3 locks switch relay 310 operated through its contacts 318*a* and its upper winding. At contacts 314, relay 310 applies ground to sleeve conductor S1 to mark the trunk circuit busy in the outgoing selector banks. At contacts 313, relay 310 closes ground to the upper winding of incoming supervisory relay 430 to bias said differentially connected relay for non-conduction. At contacts 316, relay 310 closes an illuminating circuit for busy lamp L11 and at contacts 319*a*, relay 310 connects capacitor C33 and resistor R33 across pulsing contacts 421 for the purpose of providing spark protection for these impulsing contacts.

Pulsing relay 420 releases and reoperates on each dial impulse received over the trunk line and repeats these impulses to the incoming selector at its contacts 421. Shunt 2 relay 300 operates on each digit from ground through contacts 423 and 318*b* and at contacts 301 and 302, shunts the left-hand windings of repeat coil RC31 and the lower winding of relay 430 during impulsing.

When the call is answered at the called station, battery is reversed over conductors T3 and R3 in the well known manner and serves to operate incoming supervisory relay 430. At contacts 431, 432 and 433, 434, relay 430 reverses battery to the trunk line conductors T2 and R2 to repeat the answer supervision to the distant office.

When the calling party in the distant office hangs up, pulsing relay 420 in the illustrated trunk circuit releases and opens the loop to the incoming selector. When the incoming selector releases and ground is removed from sleeve conductor S3, relay 310 releases and all of the circuits utilized to establish the connection are returned to their normal condition.

While there has been shown and described what is at present considered to be the preferred embodiment of the invention, modifications thereto will readily occur to those skilled in the art and it is, therefore, intended to cover in the appended claims all such modifications as fall within the true scope and spirit of the invention.

What is claimed is:

1. In a telephone system having first and second offices interconnected by a trunk line, a trunk circuit terminating said trunk line in said first office, first and second classes of calling lines in said first office, means for extending a connection from a calling line of either said first or second class to said trunk circuit, said connection including line conductors, means in said trunk circuit for extending the connection over said trunk line to a called line in said second office, means in said second office for transmitting an answer supervisory signal over said trunk line as long as said called line is in an answered condition, means in said trunk circuit responsive to the receipt of said signal only when the calling line is of said first class for reversing battery over said line conductors, and means in said trunk circuit responsive to the discontinuance of the transmittal of said signal only when the calling line is of said second class for opening said line conductors between the calling line and said trunk circuit.

2. In a telephone system having first and second offices interconnected by a trunk line, a trunk circuit terminating said trunk line in said first office, first and second classes of calling lines in said first office, means for extending a connection from a calling line of either said first or second class to said trunk circuit, said connection including line conductors, said trunk circuit comprising a calling bridge relay connected to said line conductors and which is operated over said line conductors when a call is extended to said trunk circuit, means responsive to the operation of said relay for extending the connection to a called line in said second office, means in said second office for transmitting an answer supervisory signal over said trunk line only so long as said called line is in an answered condition, means in said trunk circuit responsive to the receipt of said signal only when the calling line is of said first class for reversing battery over said line conductors, means in said trunk circuit responsive to the discontinuance of the transmittal of said signal only when the calling line is of said second class for opening said line conductors between said calling line and said relay, and means in said trunk circuit for closing an alternate operating circuit for said relay while said line conductors are open.

3. In a telephone system having first and second offices interconnected by a trunk line, a trunk circuit terminating said trunk line in said first office, first and second classes of calling lines in said first office, means for extending a connection from a calling line of either said first or second class to said trunk circuit, said connection including line conductors, means in said trunk circuit responsive to the extension of a connection thereto only when said calling line is of said second class for immediately reversing battery over said line conductors, means in said trunk circuit for extending the connection over said trunk line to a called line in said second office, means in said second office for transmitting an answer supervisory signal over said trunk line while said called line is in an answered condition, means in said trunk circuit responsive to the receipt of said signal only when the calling line is of said first class for reversing battery over said line conductors, and means in said trunk circuit responsive to the discontinuance of the transmittal of said signal only when the calling line is of said second class for opening said line conductors.

4. In a telephone system having first and second offices interconnected by a trunk line, a trunk circuit terminating said trunk line in said first office, first and second classes of calling lines in said first office, means for extending a connection from a calling line of either said first or second class to said trunk circuit, said connection including line conductors, a calling bridge relay connected to said line conductors in said trunk circuit, means in said trunk circuit responsive to the extension of a connection thereto only when the calling line is of said second class for reversing battery over said line conductors, means for controlling said relay over said line conductors to extend the connection over said trunk line to a called line in said second office, means in said second office for transmitting a supervisory signal over said trunk line as long as said called line is in an answered condition, means in said trunk circuit responsive to the receipt of said signal only when the calling line is of said first class for reversing battery over said line conductors, means in said trunk circuit responsive to the discontinuance of the transmittal of said signal only when the calling line is of said second class for opening said line conductors between the calling line and said relay, and means in said trunk circuit for providing an alternate control circuit for said relay while said line conductors are open.

5. In a telephone system, an operator position comprising a cord circuit, a trunk circuit for extending calls from said position to called lines, said cord circuit and said trunk circuit each having tip and ring conductors, a two-winding battery feed relay having one winding connected between ground potential and the tip conductor of said cord circuit and the other winding connected between battery potential and the ring conductor of said cord circuit, a two-winding calling bridge relay having one winding connected between ground potential and the tip conductor of said trunk circuit and the other winding connected between battery potential and the ring conductor of said trunk circuit, means for connecting the tip and ring conductors of said cord circuit to the ring and tip conductors, respectively, of said trunk circuit to thereby operate said battery feed and calling bridge relays in series, and means in said trunk circuit responsive to a disconnect operation performed on a called line for disconnecting the tip and ring conductors of said cord circuit from the ring and tip conductors, respectively, of said trunk circuit and for connecting said trunk circuit tip conductor to said trunk circuit ring conductor, whereby said battery feed relay is deenergized and said calling bridge relay remains energized.

References Cited in the file of this patent

UNITED STATES PATENTS

| | | |
|---|---|---|
| 1,274,357 | Fish | July 30, 1918 |
| 1,349,381 | Jacobsen | Aug. 10, 1920 |
| 2,169,389 | Keckler | Aug. 15, 1939 |
| 2,792,451 | Pharis et al. | May 14, 1957 |
| 2,805,288 | Fisher | Sept. 3, 1957 |